United States Patent
Kim et al.

(10) Patent No.: US 9,293,943 B2
(45) Date of Patent: Mar. 22, 2016

(54) BATTERY CHARGING METHOD AND SYSTEM USING WIRELESS POWER TRANSMISSION

(71) Applicant: ELECTRONICS AND TELECOMMUNICATIONS RESEARCH INSTITUTE, Daejeon (KR)

(72) Inventors: Seong Min Kim, Daejeon (KR); In Kui Cho, Daejeon (KR); Je Hoon Yun, Deajeon (KR); Jung Ick Moon, Daejeon (KR); Sang Hoon Cheon, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 177 days.

(21) Appl. No.: 13/953,992

(22) Filed: Jul. 30, 2013

(65) Prior Publication Data

US 2014/0152247 A1    Jun. 5, 2014

(30) Foreign Application Priority Data

Dec. 3, 2012    (KR) .................... 10-2012-0138929

(51) Int. Cl.
| | |
|---|---|
| *H02J 7/00* | (2006.01) |
| *H02J 7/02* | (2006.01) |
| *H02J 5/00* | (2006.01) |
| *H02J 17/00* | (2006.01) |

(52) U.S. Cl.
CPC ................. *H02J 7/025* (2013.01); *H02J 5/005* (2013.01); *H02J 17/00* (2013.01)

(58) Field of Classification Search
CPC .......... H02J 5/005; H02J 7/025; H02J 7/0013
USPC ............................................................ 320/108
See application file for complete search history.

(56) References Cited

U.S. PATENT DOCUMENTS

| | | | |
|---|---|---|---|
| 8,169,185 B2* | 5/2012 | Partovi et al. | 320/108 |
| 8,875,086 B2* | 10/2014 | Verghese et al. | 716/136 |
| 2010/0225272 A1* | 9/2010 | Kirby et al. | 320/108 |
| 2011/0080051 A1* | 4/2011 | Lee et al. | 307/104 |
| 2011/0254377 A1* | 10/2011 | Wildmer et al. | 307/104 |
| 2012/0025611 A1* | 2/2012 | Kamata et al. | 307/43 |
| 2012/0025627 A1* | 2/2012 | Shionoiri et al. | 307/104 |
| 2012/0025631 A1* | 2/2012 | Shionoiri et al. | 307/149 |

(Continued)

FOREIGN PATENT DOCUMENTS

| | | |
|---|---|---|
| KR | 1020070009936 A | 1/2007 |
| KR | 1020110074020 A | 6/2011 |
| WO | 2011/062827 A2 | 5/2011 |

*Primary Examiner* — Suchin Parihar
(74) *Attorney, Agent, or Firm* — Ladas & Parry LLP (57) ABSTRACT

Provided is a battery charging method using wireless power transmission, the method including: receiving a first message associated with a battery charge start from a reception apparatus; discovering an optimal frequency band for a transmit power signal to be transmitted to the reception apparatus based on the first message; receiving, from the reception apparatus, a second message that includes an extra power value and a charge power value, and is associated with a charge state of the reception apparatus; and adaptively controlling transmit power so that the extra power value is maintained to be constant in proportion to a relationship between the charge power value and a first parameter, based on the second message.

20 Claims, 8 Drawing Sheets

(56) References Cited

U.S. PATENT DOCUMENTS

| | | | |
|---|---|---|---|
| 2012/0235636 A1* | 9/2012 | Partovi | 320/108 |
| 2012/0280575 A1* | 11/2012 | Kim et al. | 307/104 |
| 2013/0057078 A1* | 3/2013 | Lee et al. | 307/104 |
| 2013/0249479 A1* | 9/2013 | Partovi | 320/108 |
| 2013/0300204 A1* | 11/2013 | Partovi | 307/104 |
| 2014/0111022 A1* | 4/2014 | Yamakawa | 307/104 |
| 2015/0084438 A1* | 3/2015 | Beckman | 307/149 |
| 2015/0207543 A1* | 7/2015 | Cooper et al. | 320/108 |

\* cited by examiner

BATTERY CHARGING METHOD AND SYSTEM USING WIRELESS POWER TRANSMISSION

CROSS-REFERENCE TO RELATED APPLICATION

This application claims the priority benefit of Korean Patent Application No. 10-2012-0138929, filed on Dec. 3, 2012, in the Korean Intellectual Property Office, the disclosure of which is incorporated herein by reference.

BACKGROUND

1. Field of the Invention

The present invention relates to a battery charging system and method using wireless power transmission, and more particularly, to a technology of charging a battery using wireless power transmission of a magnetic resonance scheme.

2. Description of the Related Art

A technology of charging a battery using wireless power transmission of a magnetic resonance scheme may refer to a technology of performing wireless power transmission through a transmitting and receiving resonance coil, and may include a constant current charging scheme of maintaining charge current to be constant, and a constant voltage charging scheme of maintaining charge voltage to be constant.

SUMMARY

An aspect of the present invention provides a method, apparatus, and system for charging a battery using wireless power transmission of a magnetic resonance scheme.

Another aspect of the present invention also provides a method, apparatus, and system that may control transmit power of a transmission apparatus based on a charge state of a reception apparatus during a process of charging a battery using wireless power transmission of a magnetic resonance scheme.

Another aspect of the present invention also provides a method, apparatus, and system that may control transmit power of a transmission apparatus based on a charge power value of a reception apparatus and an extra power value of the reception apparatus.

Another aspect of the present invention also provides a method, apparatus, and system that may suspend transmission of transmit power based on a charge state of a reception apparatus during a process of transmitting the transmit power of a transmission apparatus to the reception apparatus.

According to an aspect of the present invention, there is provided a battery charging method using wireless power transmission, the method including receiving a first message associated with a battery charge start from a reception apparatus; discovering an optimal frequency band for a transmit power signal to be transmitted to the reception apparatus based on the first message; receiving, from the reception apparatus, a second message that includes an extra power value and a charge power value, and is associated with a charge state of the reception apparatus; and adaptively controlling transmit power so that the extra power value is maintained to be constant in proportion to a relationship between the charge power value and a first parameter, based on the second message.

The receiving of the second message may include continuously receiving the second message based on predetermined interval information, and the controlling may include updating the charge power value and the extra power value from the second message; and adaptively adjusting the transmit power so that the extra power value is maintained to be constant in proportion to the relationship between the charge power value and the first parameter, based on the updated charge power value and the extra power value.

The second message may further include at least one of a set including a battery voltage value and a charge current value and a set including a battery current value and a charge voltage value, and a transmit power value, and the controlling may include setting an initial transmit power value based on at least one of the set including the battery voltage value and the charge current value and the set including the battery current value and the charge voltage value.

The battery charging method may further include adaptively adjusting the transmit power value in response to a second parameter preset from an initial transmit power value adjusted.

The controlling may include transmitting the transmit power controlled based on the second message.

The charge power may be power that is input to a battery of the reception apparatus, excluding extra power of the reception apparatus from the transmit power.

The controlling may include suspending transmission of the transmit power based on the second message.

The suspending may include updating the number of full charge in at least one of a case in which a battery voltage value increases to be greater than a predetermined full charge battery voltage value and a case in which a battery current value increases to be greater than a predetermined full charge current value; and suspending the transmission of the transmit power by comparing the updated number of full charge with a third parameter.

The suspending may include receiving, from the reception apparatus, a third message associated with charge suspension of the reception apparatus; and suspending the transmission of the transmit power based on the third message.

The receiving of the first message may include receiving an identification message of the reception apparatus from the reception apparatus.

The battery charging method may further include transmitting the first message associated with the battery charge start to a transmission apparatus; measuring a transmit power value received from the transmission apparatus, the charge power value, and the extra power value; transmitting, to the transmission apparatus, the second message that includes the extra power value and the charge power value, and is associated with the charge state of the reception apparatus; and receiving, from the transmission apparatus, the transmit power adaptively controlled so that the extra power value is maintained to be constant in proportion to the relationship between the charge power value and the first parameter, based on the second message.

The measuring may include collecting the extra power.

According to another aspect of the present invention, there is provided a battery charging system using wireless power transmission, the system including a transmission apparatus; and a reception apparatus. The transmission apparatus may receive a first message associated with a battery charge start from a reception apparatus, may discover an optimal frequency band for a transmit power signal to be transmitted to the reception apparatus based on the first message, may receive, from the reception apparatus, a second message that includes an extra power value and a charge power value, and is associated with a charge state of the reception apparatus, and may adaptively control transmit power to so that the extra power value is maintained to be constant in proportion to a relationship between the charge power value and a first parameter, based on the second message.

The transmission apparatus may continuously receive the second message based on predetermined interval information, may update the charge power value and the extra power value from the second message, and may adaptively adjust the transmit power so that the extra power value is maintained to be constant in proportion to the relationship between the charge power value and the first parameter, based on the updated charge power value and the extra power value.

The transmission apparatus may transmit the transmit power controlled based on the second message, and may suspend transmission of the transmit power based on the second message.

The reception apparatus may transmit the first message associated with the battery charge start to a transmission apparatus, may measure a transmit power value received from the transmission apparatus, the charge power value, and the extra power value, may transmit, to the transmission apparatus, the second message that includes the extra power value and the charge power value, and is associated with the charge state of the reception apparatus, and may receive, from the transmission apparatus, the transmit power adaptively controlled so that the extra power value is maintained to be constant in proportion to the relationship between the charge power value and the first parameter, based on the second message.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures, but the present invention is not limited thereto or restricted thereby. In particular, although the embodiments of the present invention describe a structure of using a constant current charging scheme for maintaining charge current to be constant, the embodiments may also be applied to a constant voltage charging scheme and a case in which the constant current charging scheme and the constant voltage charging scheme are mixed.

Figure 1:
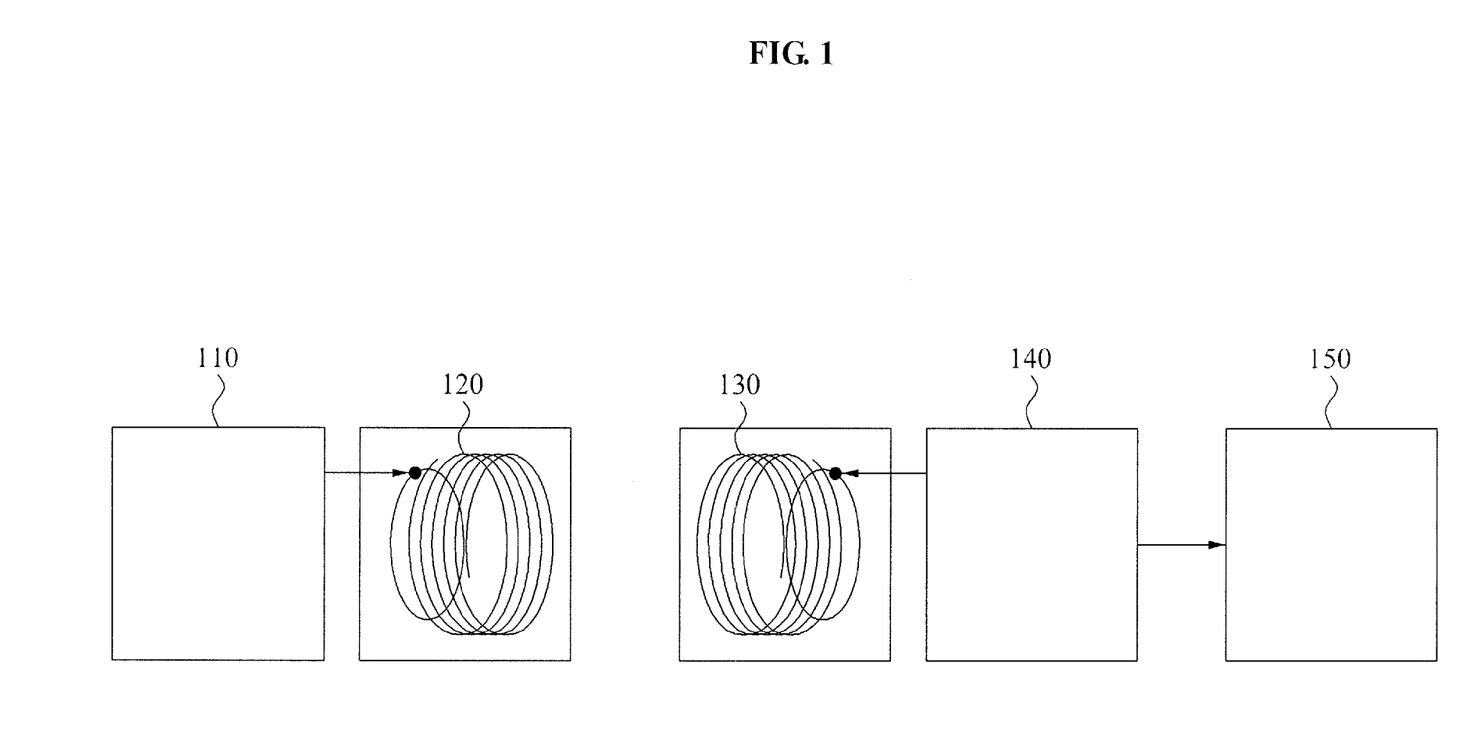
FIG. 1 is a diagram illustrating a battery charging system using wireless power transmission of a magnetic resonance scheme according to an embodiment of the present invention.

FIG. 1 is a diagram illustrating a battery charging system using wireless power transmission of a magnetic resonance scheme according to an embodiment of the present invention.

Referring to FIG. 1, the battery charging system may include a transmission apparatus 110, a transmitting resonance coil 120, a receiving resonance coil 130, a reception apparatus 140, and a battery 150. Here, the transmission apparatus 110 may generate a radio frequency (RF) power signal, and may transfer the RF power signal to the reception apparatus 140 through the transmitting resonance coil 120 and the receiving resonance coil 130. The reception apparatus 140 may convert the input RE power signal to a charge power signal and thereby input the converted charge power signal into the battery 150. Through the above process, the battery 150 may be charged. Here, the RF power signal may indicate a transmit power signal. There may be remaining power excluding charge power, input to the battery 150, from the transmit power. The remaining power may be regarded as extra power.

In the battery charging system, an amount of charge power required may increase over time, based on an amount of power charged in the battery 150. For example, in the case of a constant current charging scheme, a voltage of the battery 150 may increase while charge continues to a charge power signal having a constant current value. In the case of a constant voltage charging scheme, current flowing in the battery 150 may increase while charge continues to a charge power signal having a constant voltage value. Accordingly, an amount of power charged in the battery 150 may increase. Adaptively responding thereto, there is a need to control transmit power of the transmission apparatus 110 based on a charge state of the battery 150.

Figure 2:
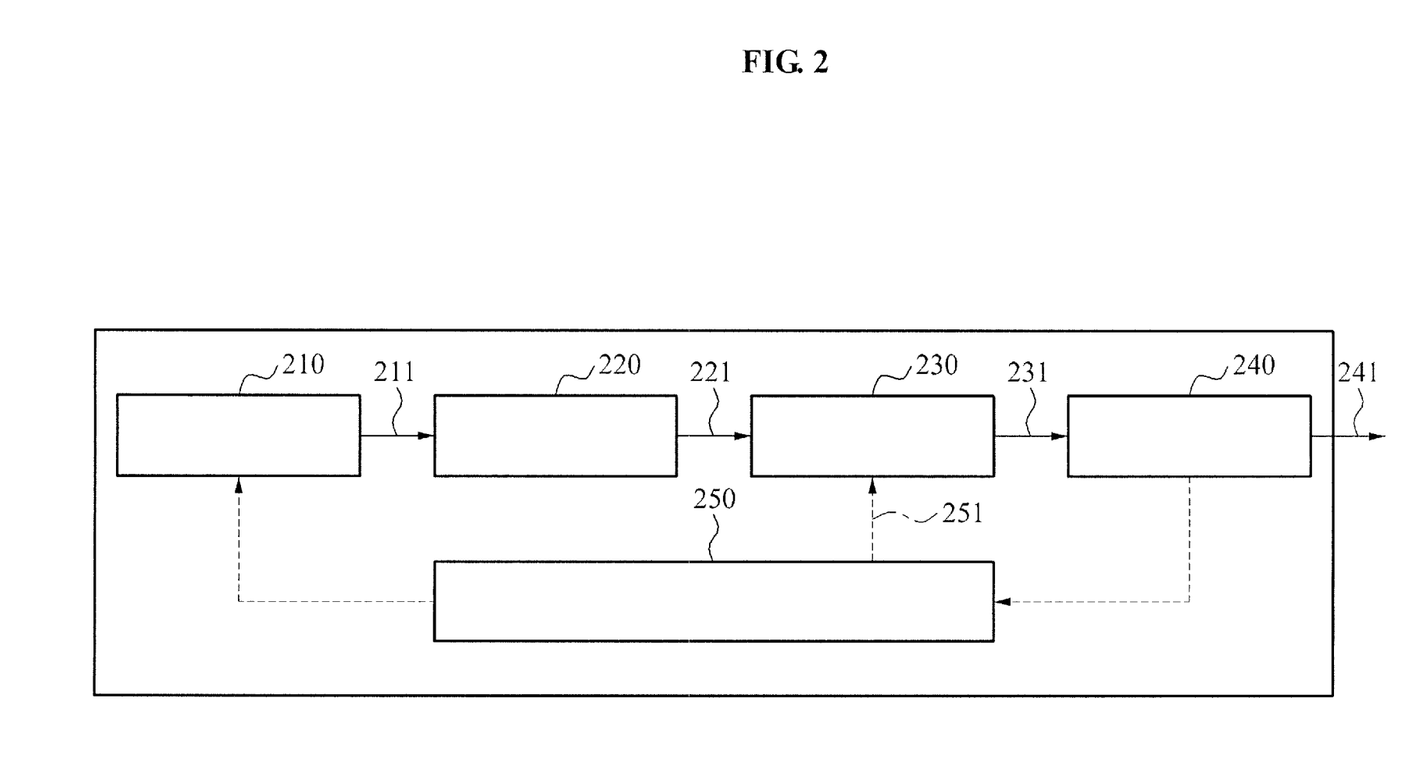
FIG. 2 is a block diagram illustrating a transmission apparatus of a battery charging system using wireless power transmission of a magnetic resonance scheme according to an embodiment of the present invention.

FIG. 2 is a block diagram illustrating a transmission apparatus of a battery charging system using wireless according to an embodiment of the present invention.

Referring to FIG. 2, the transmission apparatus may include a RF low power signal generation block 210, an RF transmit power signal generation block 220, an RF transmit power control block 230, a standing-wave detection block 240, and a communication and control block 250.

In operation 211, the RF low power signal generation block 210 may generate an RF signal to be transmitted from the transmission apparatus, and may transfer the RF signal to the RF transmit power signal generation block 220. In operation 221, the RF transmit power signal generation block 220 may amplify and convert the input low power RF signal to an RF power signal required by a reception apparatus, and may transfer the converted RF power signal to the RF transmit power control block 230. Here, the RF power signal may be a transmit power signal.

In response to a command received from the communication and control block 250 in operation 251, the RF transmit power control block 230 may adjust a level of the RF power signal to be transmitted from the transmission apparatus and thereby transfer the adjusted level of the RF power signal to the standing wave detection block 240 in operation 231. Here, the communication and control block 250 may receive a state of the reception apparatus and a battery through communication with the reception apparatus and may transfer a command of controlling the transmit power of the transmission apparatus to the RF transmit power control block 230 in operation 251.

In operation 241, the standing wave detection block 240 may continuously detect a standing wave ratio of an output end of the transmission apparatus, thereby detecting access of a receiving resonance coil and protecting the transmission apparatus from an effect that may affect the transmission apparatus due to a sudden alienation of the receiving resonance coil.

Figure 3:
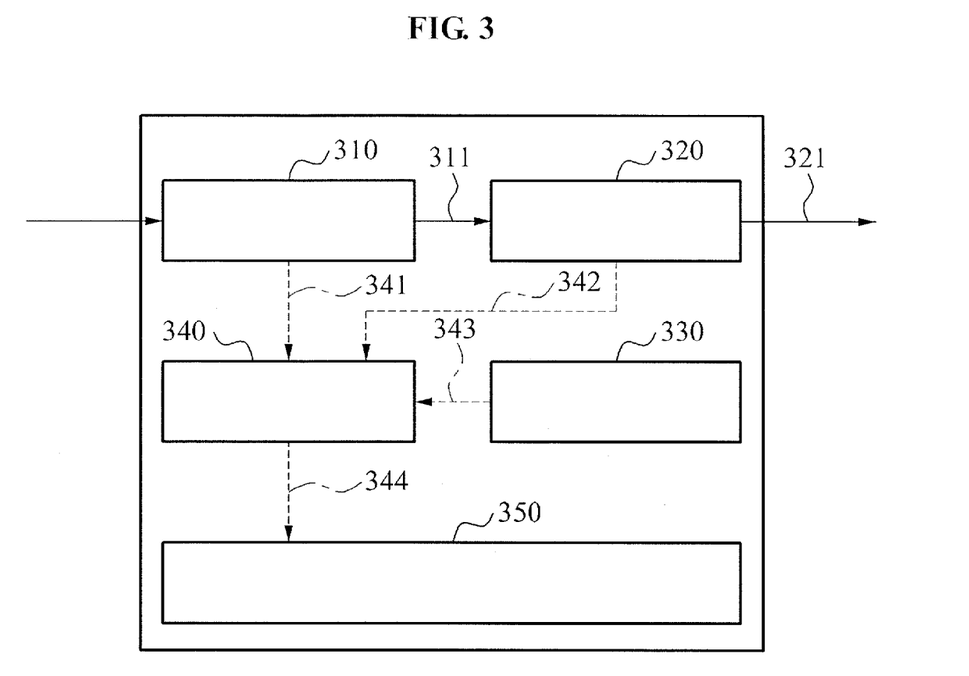
FIG. 3 is a block diagram illustrating a reception apparatus of a battery charging system using wireless power transmission of a magnetic resonance scheme according to an embodiment of the present invention.

FIG. 3 is a block diagram illustrating a reception apparatus of a battery charging system using wireless power transmission of a magnetic resonance scheme according to an embodiment of the present invention.

Referring to FIG. 3, the reception apparatus may include a radio frequency to direct current (RF-DC) conversion block 310, a charge power signal generation block 320, an extra power collection block 330, a measurement block 340, and a communication and control block 350.

In operation 311, the RF-DC conversion block 310 may convert an RF power signal input through a receiving resonance coil to a DC signal and then transfer the converted DC signal to the charge power signal generation block 320. Here, the RF power signal may be a transmit power signal transmitted from a transmission apparatus.

In operation 321, the charge power signal generation block 320 may receive an output signal of the RF-DC conversion block 310, may generate a charge power signal required by a battery, and may transfer the charge power signal to the battery. Here, the extra power collection block 330 may collect extra power, that is, remaining power excluding, from the converted DC signal, the charge power signal transferred to the battery.

The measurement block 340 may measure state information of the reception apparatus provided to control the transmit power of a transmission apparatus through communication between the transmission apparatus and the reception apparatus. Here, the measured state information of the reception apparatus may include an input power value 341, a charge power value 342, and an extra power value 343 corresponding to the transmit power. Also, when a constant current charging scheme is applied, the state information of the reception apparatus may further include voltage of the battery.

The communication and control block 350 may control the transmit power of the transmission apparatus through communication with the transmission apparatus and may control an operation of the reception apparatus in response to a command of the transmission apparatus by collecting information measured in the measurement block 340 in operation 344.

Figure 4:
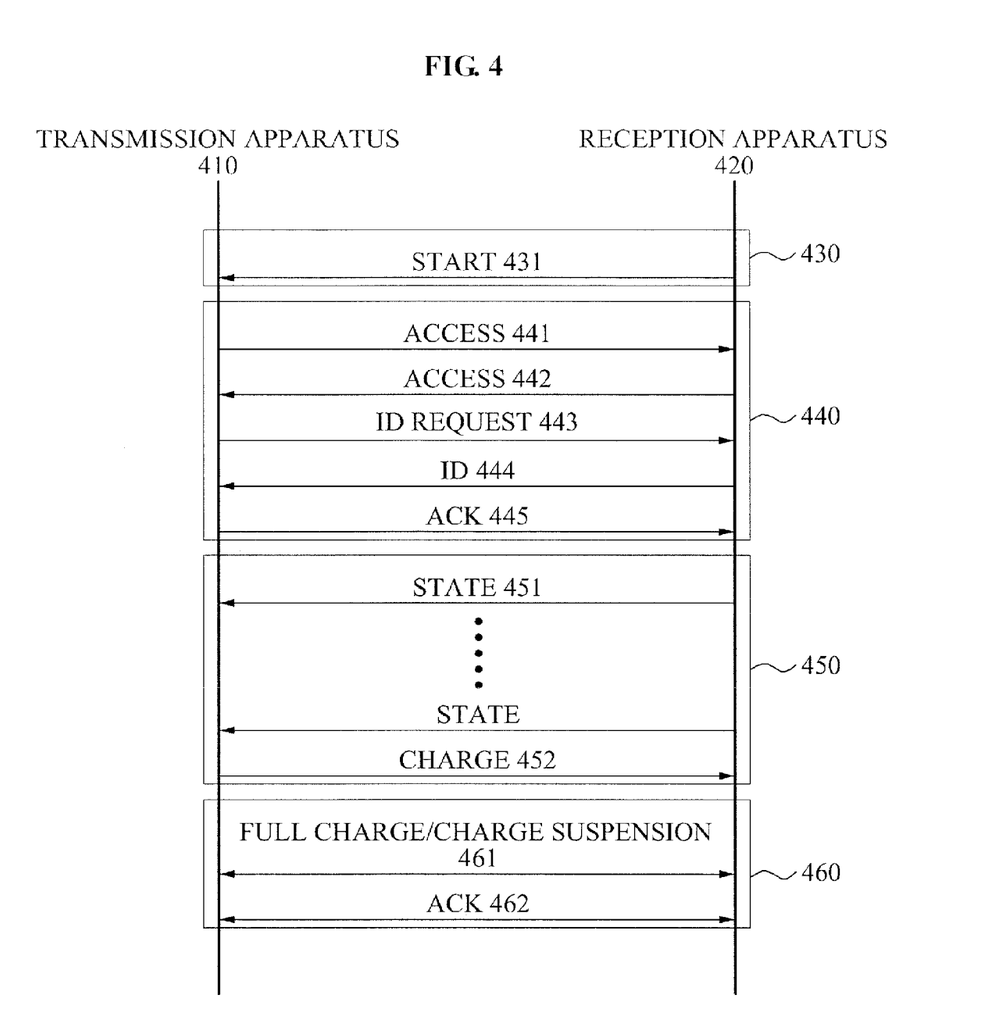
FIG. 4 is a diagram illustrating a battery charging method using wireless power transmission of a magnetic resonance scheme according to an embodiment of the present invention.

FIG. 4 is a diagram illustrating a battery charging method using wireless power transmission of a magnetic resonance scheme according to an embodiment of the present invention.

Referring to FIG. 4, the battery charging method may include an access standby process 430, an access process 440, a charge process 450, and a charge suspension process 460 that are performed between a transmission apparatus 410 and a reception apparatus 420.

In the access standby process 430, the transmission apparatus 410 may receive a first message associated with a battery charge start from the reception apparatus 420. For example, the transmission apparatus 410 may minimize an amount of power used in a standby operation by cutting off power supplied to remaining blocks excluding a communication and control block. Here, the communication and control block of the transmission apparatus 410 may be in a standby state in order to receive a "start" message from the reception apparatus 420 in operation 431. Also, during the standby process, the reception apparatus 420 may determine that battery charge is required, and a receiving resonance coil and the reception apparatus 420 may move to an area in which wireless power transmission is possible. When the movement is completed, the reception apparatus 420 may transmit the start message to the transmission apparatus 410 in operation 431. Here, the first message associated with the battery charge start may include the start message.

When the transmission apparatus 410 receives the start message from the reception apparatus 420, the transmission apparatus 410 may discover an optimal frequency band for a transmit power signal to be transmitted to the reception apparatus 420 based on the received first message. For example, the communication and control block of the transmission apparatus 410 may discover a frequency having an optimal transmission characteristic while varying a frequency based on a transmit power value of $1/100$ of the maximum transmit power amount of the transmission apparatus 410 in a transmission frequency domain of the transmission apparatus 410. Here, a process of discovering the optimal frequency band may include a process of discovering a frequency between a transmitting resonance coil and a receiving resonance coil indicating the minimum standing wave ratio, based on a characteristic of a wireless power transmission system of a magnetic resonance scheme.

The battery charging method according to the embodiment of the present invention may include the access process 440 of adjusting the transmit power of the transmission apparatus 410 so that appropriate initial charge power may be input to the battery, as a full preparation process for charging the battery through wireless power transmission between the transmission apparatus 410 and the reception apparatus 420.

In operation 441, when the start message is received, the transmission apparatus 410 may transmit an access message to the reception apparatus 420. Here, after receiving the access message, the reception apparatus 420 may retransmit the same access message to the transmission apparatus 410 in operation 442. When the access message received from the reception apparatus 420 is identical to the access message transmitted from the transmission apparatus 410, the transmission apparatus 410 may transmit an ID request message to the reception apparatus 420 in operation 443. When the ID request message is received, the reception apparatus 420 may transmit an ID message of the reception apparatus 420 to the transmission apparatus 410 in operation 444. Here, the ID message may be included in the first message associated with the battery charge start as an ID message of the reception apparatus 420 for battery charge.

In operation 445, the transmission apparatus 410 may recognize a type of the reception apparatus 420 through the ID message received from the reception apparatus 420, and may transmit an acknowledgement (ACK) message to the reception apparatus 420. Also, the reception apparatus 420 may receive the ACK message, and a process of the transmission apparatus 410 and the reception apparatus 420 may be switched to the charge process 450.

During the charge process 450, the transmission apparatus 410 and the reception apparatus 420 may perform battery charge through the wireless power transmission using the transmitting resonance coil and the receiving resonance coil.

In operation 451, the transmission apparatus 410 may receive, from the reception apparatus 420, a state message that is a second message including an extra power value and a charge power value and associated with the charge state of the reception apparatus 420, and may adaptively control transmit power so that the extra power value is maintained to be constant in proportion to a relationship between the charge power value and a first parameter, based on the second message.

The second message associated with the charge state of the reception apparatus 420 may include at least one of a set including a battery voltage value $V_{batt}$ and a charge current value $I_c$ and a set including a battery current value $I_{batt}$ and a charge voltage value $V_c$, an extra power value $P_r$ of the reception apparatus 420, a charge power value $P_c$, and an input power value $P_{in}$. Here, the input power value $P_{in}$ refers to a value of input power of the transmit power that is transmitted from the transmission apparatus 410 to the reception apparatus 420 and may be identical to the transmit power. Accordingly, the input power value $P_{in}$ may also be referred to as a transmit power value $P_{in}$.

The transmission apparatus 410 may set an initial transmit power value $P_{ini}$ using at least one of the set including the battery voltage value $V_{batt}$ and the charge current value $I_c$ and the set including the battery current value $I_{batt}$ and the charge voltage value $V_c$ according to the following Equation 1:

$$P_{ini} = V_{batt} \times I_c = I_{batt} \times V_c \quad \text{[Equation 1]}$$

The transmission apparatus 410 may adaptively adjust the transmit power value $P_{in}$ in response to a second parameter adjusted from the set initial transmit power value $P_{ini}$ according to the following Equation 2:

$$P_{ini} \geq V_{batt} \times I_c \times \eta_{rec} = I_{batt} \times V_c \times \eta_{rec} \quad \text{[Equation 2]}$$

Here, the second parameter $\eta_{rec}$ may refer to pre-estimated efficiency of the reception apparatus 420. In response to the second parameter $\eta_{rec}$ adjusted, the transmit power value $P_{in}$ may slowly increase. For example, since the efficiency of the reception apparatus 420 is generally 70% or more, the second parameter $\eta_{rec}$ may be determined to be "0.7".

When the transmit power value satisfies a condition of Equation 2 in the second message received from the reception apparatus 420, the transmission apparatus 410 may determine that sufficient power to charge the battery of a current state is input, and may transmit a charge message to the reception apparatus 420 in operation 452. Here, when the charge message is received, the reception apparatus 420 may inactivate a charge power signal generation block within the reception apparatus 420, and may start charging the battery.

The reception apparatus 420 may continuously transmit the second message to the transmission apparatus 410 based on predetermined interval information during a battery charge process. For example, the transmission apparatus 410 may receive the second message from the reception apparatus 420 based on a unit of 0.5 seconds.

Here, the transmission apparatus 410 may update the charge power value $P_c$ and the extra power value $P_r$ from the second message, thereby adaptively adjusting the transmit power so that the extra power value so that the extra power value $P_r$ may be maintained to be constant in proportion to the relationship between the charge power value $P_c$ and the first parameter as shown in the following Equation 3:

$$P_r = 0.01 \times P_c \quad \text{[Equation 3]}$$

Here, the first parameter "0.01" maybe adjusted.

According to an embodiment of the present invention, the battery charging method may transmit the transmit power to the reception apparatus 420 by controlling the transmit power of the transmission apparatus 410 and may also suspend transmission of the transmit power based on the second message associated with the charge state of the reception apparatus 420.

During the charge suspension process 460, in at least one of a case in which a battery voltage value $V_{batt}$ of the reception apparatus 420 increases to be greater than a predetermined full charge battery voltage value $V_{batt\_full}$ and a case in which a battery current value $I_{batt}$ increases to be greater than a predetermined full charge current value $I_{batt\_full}$, the transmission apparatus 410 may update the number of full charge, and may suspend the transmission of the transmit power by comparing the updated number of full charge with a third parameter. For example, when the battery voltage value $V_{batt}$ of the reception apparatus 420 is greater than the predetermined full charge battery voltage value $V_{batt\_full}$ while receiving the second message from the reception apparatus 420 ten times based on a unit of 0.5 seconds, the transmission apparatus 410 may determine that the battery charge is completed, and may transmit a full charge message to the reception apparatus 420 in operation 461. Here, when the full charge message is received in operation 461, the reception apparatus 420 may transmit an ACK message to the transmission apparatus in operation 462. Each of the transmission apparatus 410 and the reception apparatus 420 may switch a state to an access standby state capable of performing the access standby process 440.

As another charge suspension method, the transmission apparatus 410 may receive a third message associated with the charge suspension of the reception apparatus 420 from the reception apparatus 420, and may suspend transmission of the transmit power based on the third message. For example, the reception apparatus 420 may determine that the battery charge needs to be suspended during the charge process 450, and may transmit a suspend message to the transmission apparatus 410 in operation 461. When the suspend message is received, the transmission apparatus 410 may transmit an ACK message to the reception apparatus 420 in operation 462, and may switch a state of the transmission apparatus 410 to the access standby state. Here, the reception apparatus 420 may receive the ACK message in operation 462, may verify that the charge is suspended using an input power measurement value of a measurement block, and may switch a state of the reception apparatus to the access standby state.

Figure 5:
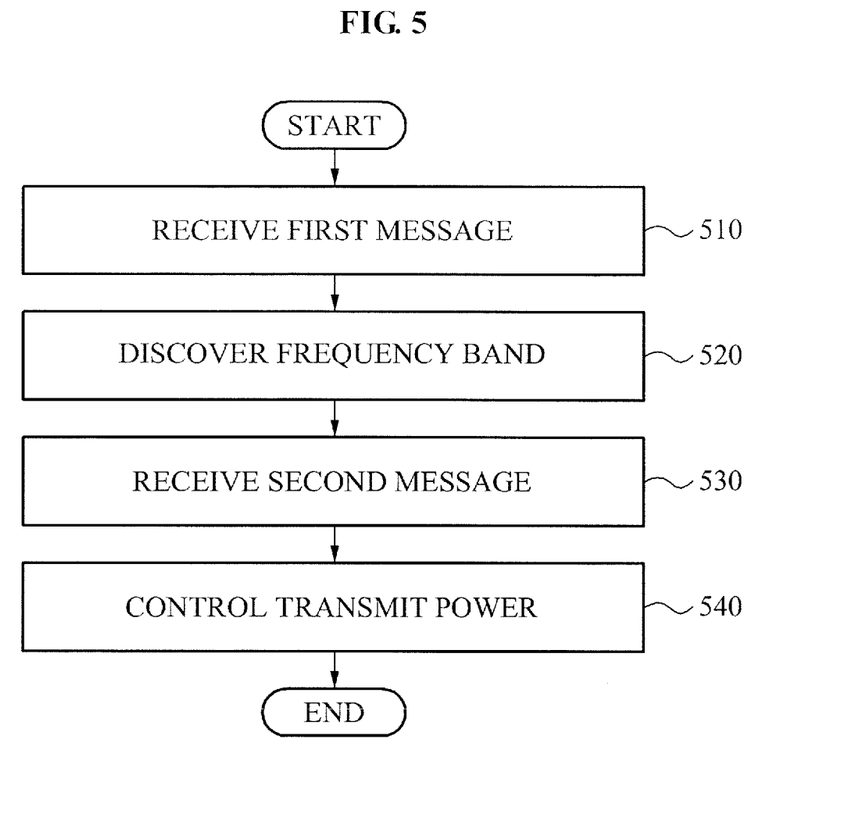
FIG. 5 is a flowchart illustrating a battery charging method using wireless power transmission of a magnetic resonance scheme according to an embodiment of the present invention.

FIG. 5 is a flowchart illustrating a battery charging method using wireless power transmission of a magnetic resonance scheme according to an embodiment of the present invention.

Referring to FIG. 5, in operation 510, a first message associated with a battery charge start may be received from a reception apparatus.

In operation 520, an optimal frequency band for a transmit power signal to be transmitted to the reception apparatus may be discovered based on the first message.

In operation 530, a second message including an extra power value and a charge power value and associated with a charge state of the reception apparatus may be received from the reception apparatus.

In operation 540, transmit power may be adaptively controlled so that the extra power value is maintained to be constant in proportion to a relationship between the charge power value and a first parameter, based on the second message.

Figure 6:
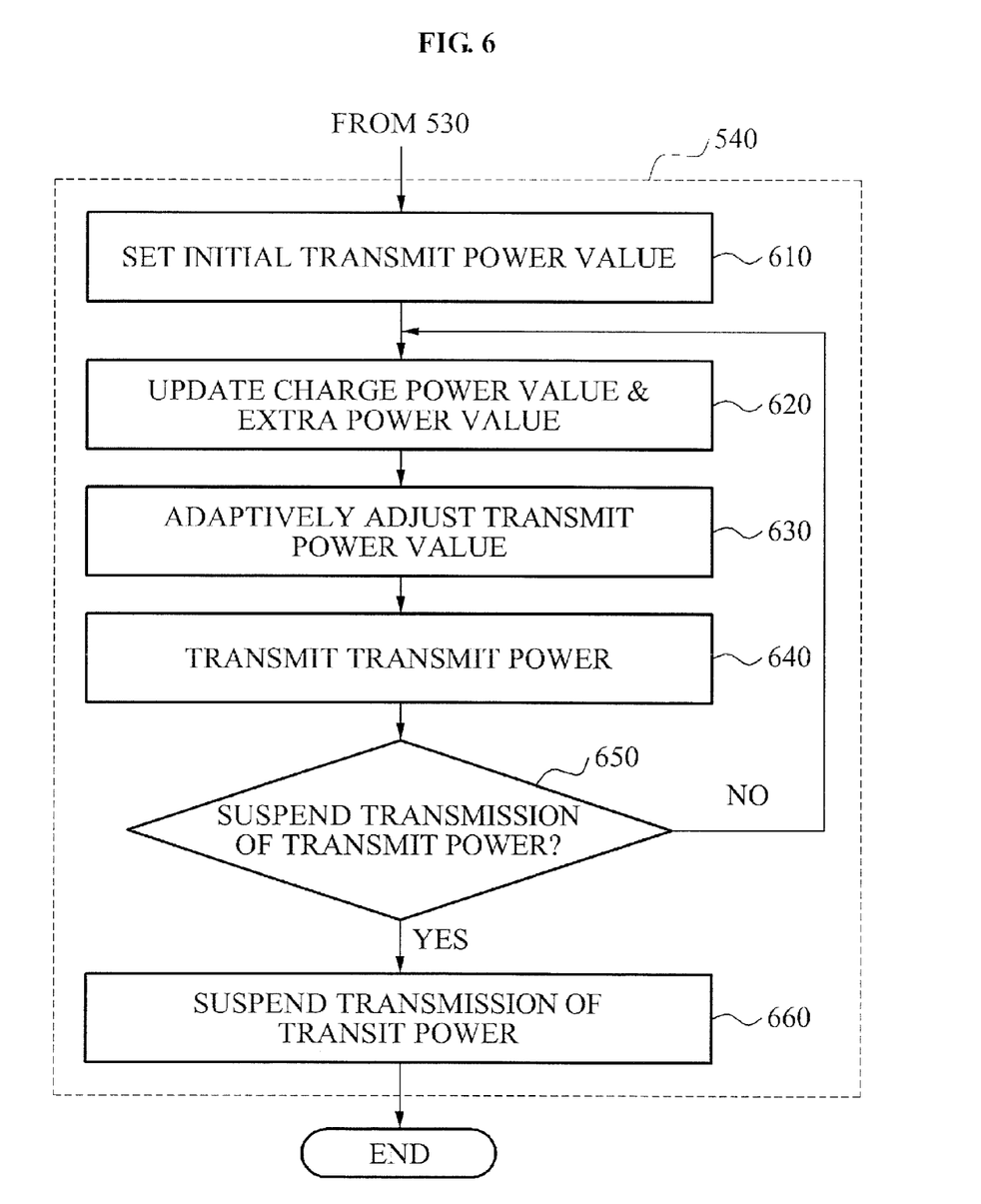
FIG. 6 is a flowchart illustrating an operation of controlling transmit power of FIG. 5.

FIG. 6 is a flowchart illustrating operation 540 of controlling the transmit power of FIG. 5.

Referring to FIG. 6, in operation 610, an initial transmit power value may be set based on at least one of a set including a battery voltage value and a charge current value and a set including a battery current value and a charge voltage value included in the second message.

In operation 620, the charge power value and the extra power value may be updated from the second message by continuously receiving the second message based on predetermined interval information.

In operation 630, the transmit power value may be adaptively adjusted in response to a second parameter preset from an initial transmit power value adjusted. Also, in operation 630, the transmit power may be adaptively controlled so that the extra power value is maintained to be constant in proportion to a relationship between the charge power value and a first parameter, based on the second message.

In operation 640, the transmit power controlled based on the second message may be transmitted.

In operation 650, whether to suspend transmission of the transmit power may be determined.

In operation 660, the transmission of the transmit power may be suspended by updating the number of full charge in at least one of a case in which a battery voltage value increases to be greater than a predetermined full charge battery voltage value and a case in which a battery current value increases to be greater than a predetermined full charge current value, and by comparing the updated number of full charge with a third parameter. Alternatively, when the reception apparatus determines whether to suspend battery charge, the reception apparatus may receive, from the reception apparatus, a third message associated with charge suspension of the reception apparatus, and may suspend the transmission of the transmit power based on the third message in operation 660.

Figure 7:
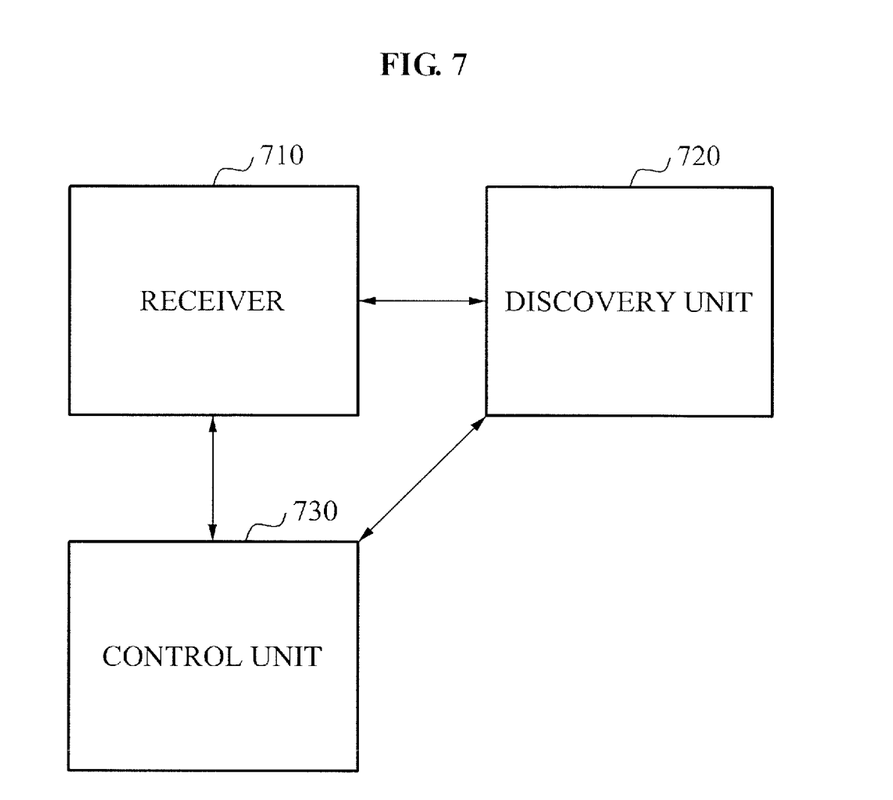
FIG. 7 is a block diagram illustrating a transmission apparatus of a battery charging system using wireless power transmission of a magnetic resonance scheme according to another embodiment of the present invention.

FIG. 7 is a block diagram illustrating a transmission apparatus of a battery charging system using wireless power transmission of a magnetic resonance scheme according to another embodiment of the present invention.

Referring to FIG. 7, the transmission apparatus may include a receiver 710, a discovery unit 720, and a control unit 730.

The receiver 710 may receive a first message associated with a battery charge start from a reception apparatus.

The receiver 710 may receive, from the reception apparatus, a second message including an extra power value and a charge power value, and associated with a charge state of the reception apparatus.

The receiver 710 may continuously receive the second message based on predetermined interval information.

The receiver 710 may receive an ID message of the reception apparatus from the reception apparatus.

The discovery unit 720 may discover an optimal frequency band for a transmit power signal to be transmitted to the reception apparatus based on the first message.

The control unit 730 may adaptively control the transmit power so that the extra power value is maintained to be constant in proportion to a relationship between the charge power value and a first parameter, based on the second message.

The control unit 730 may update the charge power value and the extra power value from the second message, and may adaptively adjust the transmit power so that the extra power value is maintained to be constant in proportion to the relationship between the charge power value and the first parameter, based on the updated charge power value and the extra power value.

The control unit 730 may set an initial transmit power value based on at least one of a set including a battery voltage value and a charge current value and a set including a battery current value and a charge voltage value.

The control unit 730 may adaptively adjust the transmit power value in response to a second parameter preset from an initial transmit power value adjusted.

The control unit 730 may transmit the transmit power controlled based on the second message.

The control unit 730 may suspend transmission of the transmit power based on the second message.

In at least one of a case in which a battery voltage value increases to be greater than a predetermined full charge battery voltage value and a case in which a battery current value increases to be greater than a predetermined full charge current value, the control unit 730 may suspend the transmission of the transmit power by updating the number of full charge, and by comparing the updated number of full charge with a third parameter.

The control unit 730 may receive, from the reception apparatus, a third message associated with charge suspension of the reception apparatus, and may suspend the transmission of the transmit power based on the third message.

Figure 8:
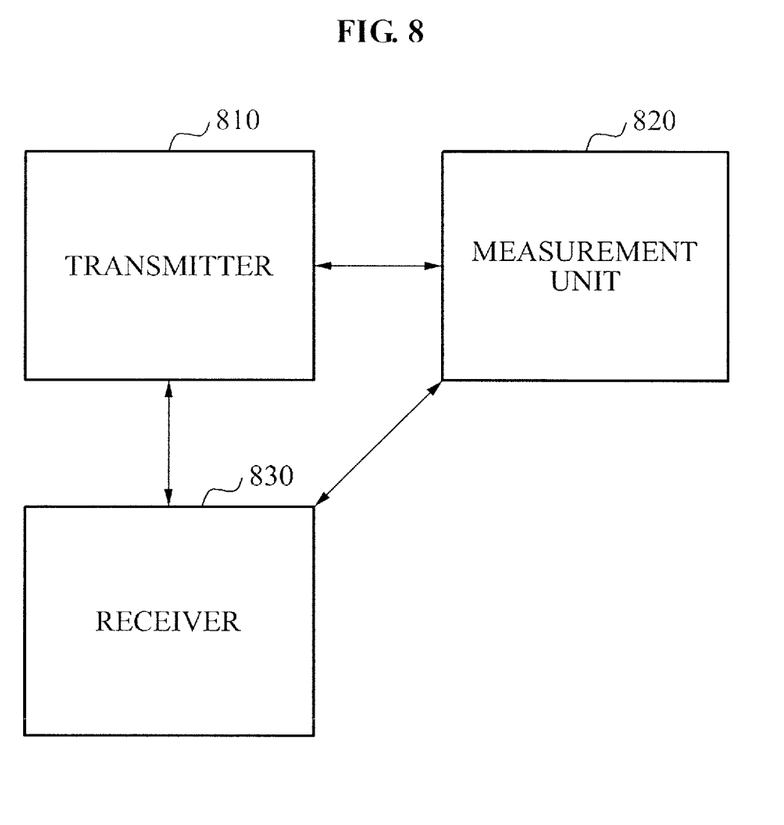
FIG. 8 is a block diagram illustrating a reception apparatus of a battery charging system using wireless power transmission of a magnetic resonance scheme according to another embodiment of the present invention.

FIG. 8 is a block diagram illustrating a reception apparatus of a battery charging system using wireless power transmission of a magnetic resonance scheme according to another embodiment of the present invention.

Referring to FIG. 8, the reception apparatus may include a transmitter 810, a measurement unit 820, and a receiver 830.

The transmitter 810 may transmit a first message associated with a battery charge start to a transmission apparatus.

The transmitter 810 may transmit, to the transmission apparatus, a second message including an extra power value and a charge power value, and associated with the charge state of the reception apparatus.

The measurement unit 820 may measure a transmit power value received from the transmission apparatus, the charge power value, and the extra power value.

The measurement unit 820 may collect extra power.

The receiver 830 may receive, from the transmission apparatus, the transmit power adaptively adjusted so that the extra power value is maintained to be constant in proportion to the relationship between the charge power value and the first parameter, based on the second message.

According to embodiments of the present invention, there may be provided a method, apparatus, and system for charging a battery using wireless power transmission of a magnetic resonance scheme.

Also, according to embodiments of the present invention, there may be provided a method, apparatus, and system that may control transmit power of a transmission apparatus based on a charge state of a reception apparatus during a process of charging a battery using wireless power transmission of a magnetic resonance scheme.

Also, according to embodiments of the present invention, there may be provided a method, apparatus, and system that may control transmit power of a transmission apparatus based on a charge power value of a reception apparatus and an extra power value of the reception apparatus.

Also, according to embodiments of the present invention, there may be provided a method, apparatus, and system that may suspend transmission of transmit power based on a charge state of a reception apparatus during a process of transmitting the transmit power of a transmission apparatus to the reception apparatus.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A battery charging method using wireless power transmission, the method comprising:
    receiving a first message associated with a battery charge start from a reception apparatus;
    discovering an optimal frequency band for a transmit power signal to be transmitted to the reception apparatus based on the first message;
    receiving, from the reception apparatus, a second message that comprises an extra power value and a charge power value, and is associated with a charge state of the reception apparatus; and
    adaptively controlling transmit power so that the extra power value is maintained to be constant in proportion to a relationship between the charge power value and a first parameter, based on the second message.

2. The method of claim 1, wherein
the receiving of the second message comprises:
continuously receiving the second message based on predetermined interval information, and
the controlling comprises:
updating the charge power value and the extra power value from the second message; and
adaptively adjusting the transmit power so that the extra power value is maintained to be constant in proportion to the relationship between the charge power value and the first parameter, based on the updated charge power value and the extra power value.

3. The method of claim 1, wherein
the second message further comprises at least one of a set comprising a battery voltage value and a charge current value and a set comprising a battery current value and a charge voltage value, and a transmit power value, and
the controlling comprises:
setting an initial transmit power value based on at least one of the set comprising the battery voltage value and the charge current value and the set comprising the battery current value and the charge voltage value.

4. The method of claim 3, further comprising:
adaptively adjusting the transmit power value in response to a second parameter preset from an initial transmit power value adjusted.

5. The method of claim 1, wherein the controlling comprises:
transmitting the transmit power controlled based on the second message.

6. The method of claim 1, wherein the charge power is power that is input to a battery of the reception apparatus, excluding extra power of the reception apparatus from the transmit power.

7. The method of claim 1, wherein the controlling comprises:
suspending transmission of the transmit power based on the second message.

8. The method of claim 7, wherein the suspending comprises:
updating the number of full charge in at least one of a case in which a battery voltage value increases to be greater than a predetermined full charge battery voltage value and a case in which a battery current value increases to be greater than a predetermined full charge current value; and
suspending the transmission of the transmit power by comparing the updated number of full charge with a third parameter.

9. The method of claim 7, wherein the suspending comprises:
receiving, from the reception apparatus, a third message associated with charge suspension of the reception apparatus; and
suspending the transmission of the transmit power based on the third message.

10. The method of claim 1, wherein the receiving of the first message comprises:

receiving an identification message of the reception apparatus from the reception apparatus.

11. The method of claim 1, further comprising:
transmitting the first message associated with the battery charge start to a transmission apparatus;
measuring a transmit power value received from the transmission apparatus, the charge power value, and the extra power value;
transmitting, to the transmission apparatus, the second message that comprises the extra power value and the charge power value, and is associated with the charge state of the reception apparatus; and
receiving, from the transmission apparatus, the transmit power adaptively controlled so that the extra power value is maintained to be constant in proportion to the relationship between the charge power value and the first parameter, based on the second message.

12. The method of claim 11, wherein the measuring comprises:
collecting the extra power.

13. A battery charging system using wireless power transmission, the system comprising:
a transmission apparatus; and
a reception apparatus,
wherein the transmission apparatus receives a first message associated with a battery charge start from a reception apparatus, discovers an optimal frequency band for a transmit power signal to be transmitted to the reception apparatus based on the first message, receives, from the reception apparatus, a second message that comprises an extra power value and a charge power value, and is associated with a charge state of the reception apparatus, and adaptively controls transmit power to so that the extra power value is maintained to be constant in proportion to a relationship between the charge power value and a first parameter, based on the second message.

14. The system of claim 13, wherein the transmission apparatus continuously receives the second message based on predetermined interval information, updates the charge power value and the extra power value from the second message, and adaptively adjusts the transmit power so that the extra power value is maintained to be constant in proportion to the relationship between the charge power value and the first parameter, based on the updated charge power value and the extra power value.

15. The system of claim 13, wherein the transmission apparatus transmits the transmit power controlled based on the second message, and suspends transmission of the transmit power based on the second message.

16. The system of claim 13, wherein the reception apparatus transmits the first message associated with the battery charge start to a transmission apparatus, measures a transmit power value received from the transmission apparatus, the charge power value, and the extra power value, transmits, to the transmission apparatus, the second message that comprises the extra power value and the charge power value, and is associated with the charge state of the reception apparatus, and receives, from the transmission apparatus, the transmit power adaptively controlled so that the extra power value is maintained to be constant in proportion to the relationship between the charge power value and the first parameter, based on the second message.

17. A battery charging means using wireless power transmission, comprising:
a means for receiving a first message associated with a battery charge start from a reception apparatus means;
a means for discovering an optimal frequency band for a transmit power signal to be transmitted to the reception apparatus means based on the first message;
a means for receiving, from the reception apparatus means, a second message that comprises an extra power value and a charge power value, and is associated with a charge state of the reception apparatus means; and
a means for adaptively controlling transmit power so that the extra power value is maintained to be constant in proportion to a relationship between the charge power value and a first parameter, based on the second message.

18. The means of claim 17, wherein
a means for receiving of the second message comprises:
a means for continuously receiving the second message based on predetermined interval information, and
a means for adaptively controlling transmit power comprises:
a means for updating the charge power value and the extra power value from the second message; and
a means for adaptively adjusting the transmit power so that the extra power value is maintained to be constant in proportion to the relationship between the charge power value and the first parameter, based on the updated charge power value and the extra power value.

19. The means of claim 17, wherein
the second message further comprises at least one of a set comprising a battery voltage value and a charge current value and a set comprising a battery current value and a charge voltage value, and a transmit power value, and
a means for adaptively controlling transmit power comprises:
setting an initial transmit power value based on at least one of the set comprising the battery voltage value and the charge current value and the set comprising the battery current value and the charge voltage value.

20. The means of claim 19, further comprising:
a means for adaptively adjusting the transmit power value in response to a second parameter preset from an initial transmit power value adjusted.

* * * * *